United States Patent
Razazian (10) Patent No.: US 11,805,466 B2
(45) Date of Patent: Oct. 31, 2023

(54) METHOD AND DEVICE FOR NOTIFYING AN ELECTRICITY DISCONNECTION

(71) Applicant: SAGEMCOM ENERGY & TELECOM SAS, Rueil Malmaison (FR)

(72) Inventor: Kaveh Razazian, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 17/987,322

(22) Filed: Nov. 15, 2022

(65) Prior Publication Data

US 2023/0189116 A1 Jun. 15, 2023

(30) Foreign Application Priority Data

Dec. 15, 2021 (FR) ...................................... 2113554

(51) Int. Cl.
*H04W 40/04* (2009.01)
*H04W 84/18* (2009.01)
*H04W 40/24* (2009.01)

(52) U.S. Cl.
CPC ........... *H04W 40/04* (2013.01); *H04W 40/24* (2013.01); *H04W 84/18* (2013.01)

(58) Field of Classification Search
CPC ..... H04W 40/00; H04W 40/02; H04W 40/04; H04W 40/24; H04W 84/18
See application file for complete search history.

(56) References Cited

U.S. PATENT DOCUMENTS

| | | | |
|---|---|---|---|
| 9,913,113 B1* | 3/2018 | Huey | H04W 4/14 |
| 11,456,944 B1* | 9/2022 | Salazar Cardozo | H04L 41/0816 |
| 2013/0028295 A1* | 1/2013 | Hui | H04B 1/713 375/135 |
| 2014/0092752 A1* | 4/2014 | Hui | H04B 1/713 370/242 |
| 2019/0294124 A1* | 9/2019 | Law | G05B 19/4186 |
| 2019/0296797 A1 | 9/2019 | Teboulle et al. | |
| 2019/0356573 A1* | 11/2019 | Chirikov | H04L 45/20 |

FOREIGN PATENT DOCUMENTS

FR 3 093 841 A1 9/2020

OTHER PUBLICATIONS

Jul. 4, 2022 Search Report issued in French Patent Application No. 2113554.

* cited by examiner

*Primary Examiner* — Robert C Scheibel
(74) *Attorney, Agent, or Firm* — Williams Mullen; R. Brian Drozd (57) ABSTRACT

A method and a device for transmitting a message from a first node device to one or more node devices that are neighbours of the node device, the node devices belonging to an electrical supply network using powerline and radio communications. The first node device detects a disconnection of the electrical energy supply; the first node device checks in a routing table whether it is connected by a radio link to a neighbouring node device, if so, the first node device sends a unicast message by the radio link to the neighbouring node device indicating a disconnection of the electrical energy supply to the first node device, if not, the first node device sends a radio broadcast message indicating that a disconnection of the electrical energy supply is detected by the first node device.

8 Claims, 5 Drawing Sheets

METHOD AND DEVICE FOR NOTIFYING AN ELECTRICITY DISCONNECTION

TECHNICAL FIELD

The present invention relates to a method and a device for sending a message indicating a detection of a disconnection of the electrical energy supply.

PRIOR ART

Powerline communications PLC are developing, in particular in the context of electrical supply networks of the AMM (the abbreviation meaning "Automated Meter Management") type. Communication networks are thus implemented in electrical supply networks for automated collection by a base node device (also referred to as a "data concentrator") in the network, from smart electricity meters, of energy consumption reading data that said smart electricity meters are respectively responsible for monitoring.

The G3-PLC communication standard is defined for enabling the various node devices (in particular data concentrators and smart electricity meters) in such a network to communicate with each other. The standard is specified in the ITU-T recommendation G.9903, which in particular describes the physical layer (PHY) and the data link layer (DLL) of the OSI model (the acronym of "Open Systems Interconnection").

In a development of the G3-PLC standard defined in an Annex H of the ITU-T recommendation G.9903, for example the 2017 version Amendment 1 (May 2021), called G3-PLC Hybrid PLC & RF, an RF (the acronym for radio frequency) radio channel can be used in place of one of said PLC frequency bands. More precisely, this version of the standard allows the occasional use of a secondary radio physical layer based on a SUN FSK modulation as defined in the IEEE standard 802.15.4:2015. Thus, by using the various G3-PLC and RF media for transmitting data, the electrical supply network maximises its coverage and its resilience. An electrical supply network node capable of sending and receiving data using the two media (PLC and RF) is called a hybrid node.

However, in G3-PLC Hybrid PLC & RF, the choice of communicating between two hybrid nodes of the communication network using either a PLC frequency band or an RF radio channel is determined at the moment of construction or reconstruction of the communication routes or during the transport of data from/to the data concentrator.

With the emergence of smart electricity networks, new applications are being added, such as current disconnection management ("LAST GASP"). This application is proving more and more necessary for better management of systems and electrical networks.

The transmission of messages indicating a disconnection of the electrical energy supply must be privileged. Nevertheless, the use of the conventional technologies of broadcasting of such messages in the network risks encumbering the latter and causing the loss of transmitted data related to collision phenomena.

DISCLOSURE OF THE INVENTION

The present invention aims to ensure that the transmission of messages indicating a disconnection of the electrical energy supply is as reliable as possible while avoiding encumbering the network.

For this purpose, according to a first aspect, the invention proposes a method for transmitting a message from a first node device to one or more node devices that are neighbours of said node device, said node devices belonging to an electrical supply network using powerline and radio communications, characterised in that the method comprises the steps of:
  detecting, by the first node device, a disconnection of the electrical energy supply,
  checking, by the first node device, in a routing table, whether the first node device is connected by a radio link to a neighbouring node device,
  sending, by the first node device, if the first node device is connected by a radio link to an adjacent node device, a unicast message by the radio link to the neighbouring node device, the unicast message indicating that a disconnection of the electrical energy supply is detected by the first node device,
  sending, by the first node device, if the first node device is not connected by a radio link to a neighbouring node device, a radio broadcast message indicating that a disconnection of the electrical energy supply is detected by the first node device.

The invention also relates to a device for transmitting a message from a first node device to one or more node devices that are neighbours of said node device, said node devices belonging to an electrical supply network using powerline and radio communications, characterised in that the device comprises:
  means, included in the first node device, for detecting a disconnection of the electrical energy supply,
  means, included in the first node device, for checking, in a routing table, whether the first node device is connected by a radio link to a neighbouring node device,
  means, included in the first node device, for sending, if the first node device is connected by a radio link to a neighbouring node device, a unicast message by the radio link to the neighbouring node device, the unicast message indicating that a disconnection of the electrical energy supply is detected by the first node device,
  means, included in the first node device, for sending, if the first node device is not connected by a radio link to a neighbouring node device, a radio broadcast message using an external supply source such as batteries or Super CAP, indicating that a disconnection of the electrical energy supply is detected by the first node device.

Thus the present invention makes it possible to ensure that the transmission of messages indicating a disconnection of the electrical energy supply is as reliable as possible while avoiding encumbering the network.

In addition, during the disconnection of the electrical energy supply, the supply of the components by powerline consumes a great deal of electrical energy. A communication by powerline requires having available an electrical supply to the node of greater capacity, which is detrimental in terms of cost and encumbrance.

According to a particular embodiment of the invention, the radio broadcast message comprises a field indicating a predetermined number of times that the message must be rebroadcast by a node device receiving the broadcast message.

According to a particular embodiment of the invention, the predetermined number of times that the message must be rebroadcast is equal to zero.

According to a particular embodiment of the invention, the method furthermore comprises the steps of:

transferring, by a neighbouring node device receiving the radio broadcast message, to a concentrator node device, a unicast message indicating the disconnection of the electrical energy supply to the first node device.

According to a particular embodiment of the invention, the method furthermore comprises the steps of:

checking by the concentrator node device whether a plurality of messages indicating that the disconnection of the electrical energy supply is detected by the first node device are received, transferring a single message to a headend system indicating that the disconnection of the electrical energy supply is detected by the first node device.

The present invention also relates to a computer program product. It comprises instructions for implementing, by a node device, the method according to one of the preceding embodiments, when said program is executed by a processor of the node device.

According to a particular embodiment, the device comprises means for electrically supplying the node during at least the period of sending of the unicast or broadcast message by the radio link to the neighbouring node device.

The present invention also relates to a storage medium. It stores a computer program comprising instructions for implementing, by a node device, the method according to one of the preceding embodiments, when said program is executed by a processor of the node device.

BRIEF DESCRIPTION OF THE DRAWINGS

The features of the invention mentioned above, as well as others, will emerge more clearly from the reading of the following description of an example embodiment, said description being made in relation to the accompanying drawings, among which:

FIG. 1 *a* illustrates schematically a first example of a network wherein the present invention is implemented;

DETAILED DISCLOSURE OF EMBODIMENTS

Figure 1A:
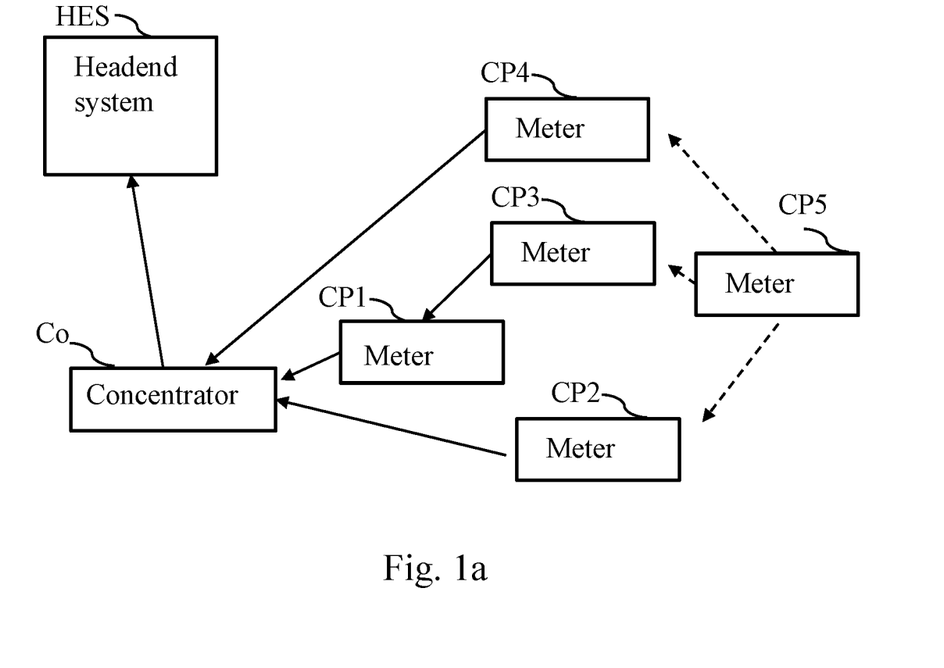

FIG. 1*a* illustrates schematically a first network wherein the present invention is implemented.

The first network is a mesh communication network. The mesh communication network is for example an electrical supply network of the AMM type. The mesh communication network relies on powerline communications PLC or radiofrequency RF communications for enabling a base node device (also called a "data concentrator") to collect, from smart electricity meters, energy consumption reading data of electrical installations that said smart electricity meters are respectively responsible for monitoring. The data concentrator and the smart electricity meters are thus node devices of the mesh communication network. The mesh communication network may comprise other node devices, for example installed at electrical transformers. The communication network therefore has a mesh structure where node devices fulfil the role of relays for increasing the range of the communications in the mesh communication network. Thus one and the same smart electricity meter potentially has a plurality of paths for reaching the data concentrator, and vice versa. In the remainder of the document, the terms "smart electricity meter" and "meter" are used interchangeably.

The present invention is thus particularly adapted to the context of G3-PLC Hybrid PLC & RF technology as defined in the ITU-T recommendation G.9903 (2017) Amendment 1 (May 2021) and more particularly in Annex H.

In the example in FIG. 1*a*, the node device CP5 detects a loss of the electrical energy supply. The routing table of the node device CP5 does not indicate that it is connected to one of its neighbouring node devices CP2, CP3 and CP4 by a radio link. When the loss of the electrical energy supply is detected, since it does not have, in its routing table, neighbouring node devices to which the node device CP5 is connected by a radio link, the node device CP5 demands the sending by the radio interface of a broadcast message indicating a disconnection of the electrical energy supply.

More precisely, the broadcast message indicating a disconnection of the electrical energy supply comprises a field indicating a predetermined number of times that the message must be rebroadcast by a node device receiving the message. For example, the predetermined number is at a maximum equal to three, preferentially equal to zero.

In the example in FIG. 1*a*, the node devices CP2, CP3 and CP4 are neighbours of the node device CP5, i.e. the node devices CP2 to CP4 receive the signals representing the broadcast message.

Each node device CP2 to CP4 decrements the value of the field indicating a predetermined number of times that the message must be rebroadcast from a unit and checks whether the decremented value is equal to zero.

If not, each node device CP2 to CP4 rebroadcasts the message received.

If so, each node device CP2 to CP4 consults a routing table that comprises at least one path for communicating with a concentrator Co, selects a path and sends, to the concentrator Co, by radio link or by powerline depending on the type of connection indicated by the routing table, a unicast message indicating that the node device CP5 has detected a disconnection of the electrical energy supply.

In the example in FIG. 1*a*, the node device CP2 demands the sending of the unicast message indicating that the node device CP5 has detected a disconnection of the electrical energy supply to the concentrator Co by a radio link, the node device CP4 demands the sending of the unicast message indicating that the node device CP4 has detected a disconnection of the electrical energy supply to the concentrator Co by a PLC link and the node device CP3 demands the sending of the unicast message indicating that the node device CP5 has detected a disconnection of the electrical energy supply to the concentrator Co by a radio link to the node device CP1, which transfers it to the concentrator Co by a PLC link.

The concentrator Co thus receives three unicast messages indicating that the node device CP5 has detected a disconnection of the electrical energy supply and transfers a single message to a headend system the selected message HES.

Figure 1B:
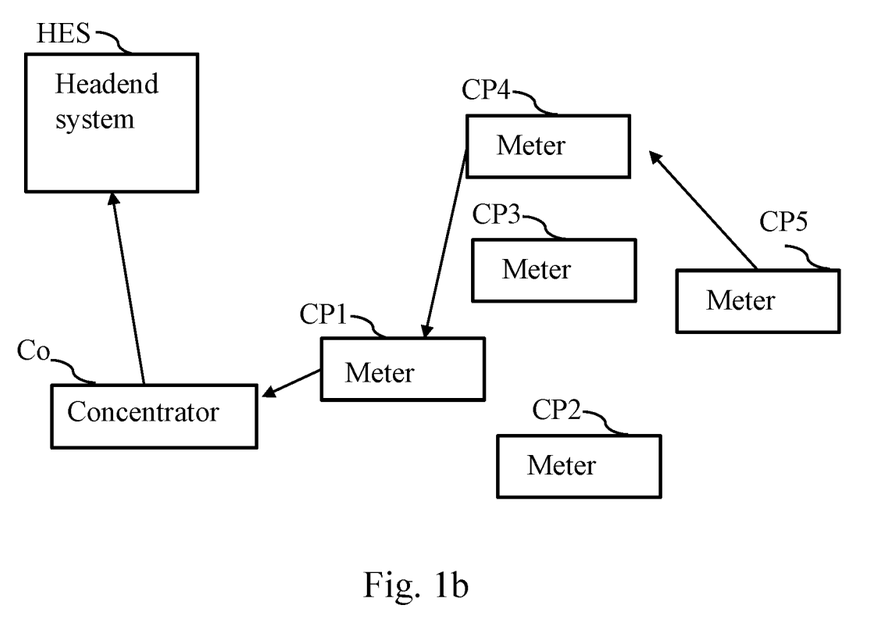
FIG. 1*b* illustrates schematically a second example of a network wherein the present invention is implemented.

FIG. 1*b* illustrates schematically a second example of a network wherein the present invention is implemented.

The first network is a mesh communication network. The mesh communication network is for example an electrical supply network of the AMM type. The mesh communication network relies on powerline communications PLC or radiofrequency RF communications for enabling a base node device (also called a "data concentrator") to collect, from smart electricity meters, energy consumption reading data of electrical installations that said smart electricity meters are respectively responsible for monitoring. The data concentrator and the smart electricity meters are thus node devices of the mesh communication network. The mesh communication network may comprise other node devices, for example installed at electrical transformers. The communication network therefore has a mesh structure where node devices fulfil the role of relays for increasing the range of the communications in the mesh communication network. Thus one and the same smart electricity meter potentially has a plurality of paths for reaching the data concentrator, and vice versa. In the remainder of the document, the terms "smart electricity meter" and "meter" are used interchangeably.

The present invention is thus particularly adapted to the context of G3-PLC Hybrid PLC & RF technology as defined in the ITU-T recommendation G.9903 (2017) Amendment 1 (May 2021) and more particularly in Annex H.

In the example in FIG. 1b, the node device CP5 detects a loss of the electrical energy supply. The routing table of the node device CP5 indicates that the node device CP4 is connected to a neighbouring node device CP4 by a radio link. On detection, having at least one neighbouring node device to which the node device CP5 is connected by a radio link, the node device CP5 demands the sending, by the radio interface, of a unicast message to the node device CP4 indicating a disconnection of the electrical energy supply.

The node device CP4 sends to the concentrator Co a unicast message indicating that the node device CP5 has detected a disconnection of the electrical energy supply.

The concentrator Co receives the unicast message indicating that the node device CP5 has detected a disconnection of the electrical energy supply and transfers it to the headend system HES.

Figure 2:
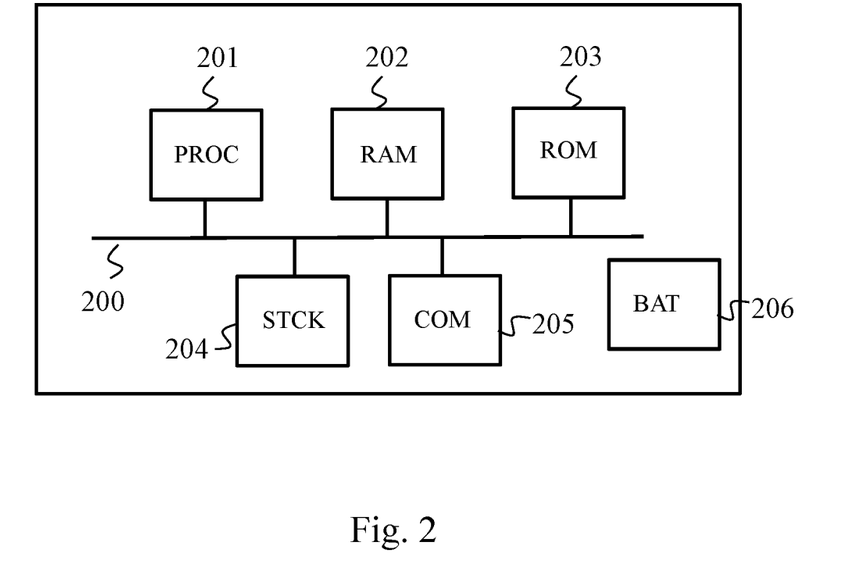
FIG. 2 illustrates schematically the architecture of a meter wherein the present invention is implemented.

FIG. 2 illustrates schematically the architecture of a meter wherein the present invention is implemented.

According to the example of hardware architecture shown in FIG. 2, each meter CP1 to CP5 comprises, connected by a communication bus 200: a processor or CPU (central processing unit) 201; a random access memory RAM 202; a read only memory ROM 203, a storage medium such as a hard disk (or a storage medium reader, such as an SD (Secure Digital) card reader 204; at least one communication interface 205 enabling the meter to communicate with the equipment in the local area network.

Each meter CP1 to CP5 comprises electrical energy storage means BAT 206 for supplying electrical energy when an interruption is detected of the electrical energy supply to the meter during at least the period of sending the unicast message or broadcasting by the radio link to the neighbouring node device.

The electrical energy storage means BAT are for example a battery or a high-capacitance capacitor.

The processor 201 is capable of executing instructions loaded in the RAM 202 from the ROM 203, from an external memory (not shown), from a storage medium (such as an SD card), or from a communication network. When the meter is powered up, the processor 201 is capable of reading instructions from the RAM 202 and executing them. These instructions form a computer program causing the implementation, by the processor 201, of all or part of the method described in relation to FIG. 4 or FIG. 5.

The method described below in relation to FIG. 4 or 5 can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit). In general the meter comprises electronic circuitry configured for implementing the methods described in relation to FIG. 4 or 5.

Figure 3:
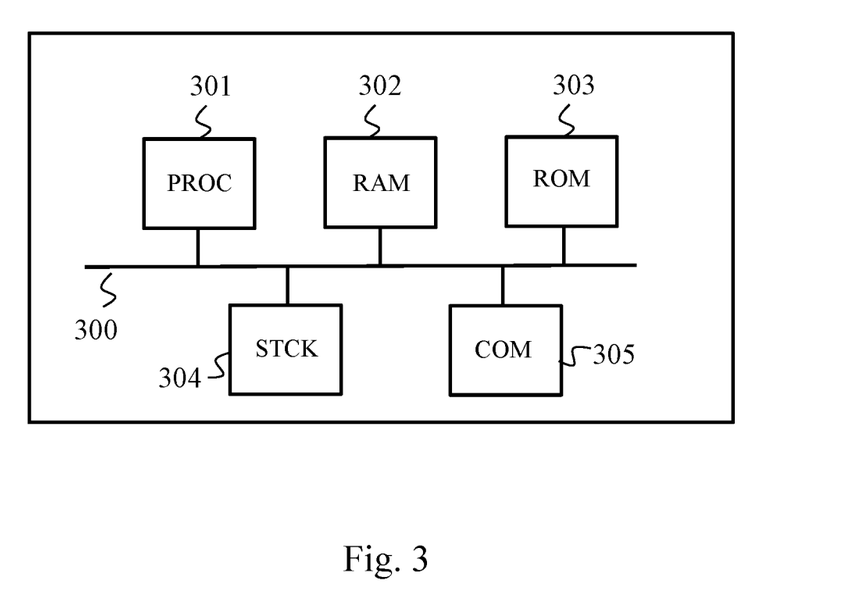
FIG. 3 illustrates schematically the architecture of a concentrator wherein the present invention is implemented.

FIG. 3 illustrates schematically the architecture of a concentrator wherein the present invention is implemented.

According to the example of hardware architecture shown in FIG. 3, the concentrator Co comprises, connected by a communication bus 300: a processor or CPU (central processing unit) 301; a random access memory RAM 302; a read only memory ROM 303, a storage medium such as a hard disk (or a storage medium reader, such as an SD (Secure Digital) card reader 304; at least one communication interface 305 enabling the meter to communicate with the equipment in the local area network.

The processor 301 is capable of executing instructions loaded in the RAM 302 from the ROM 303, from an external memory (not shown), from a storage medium (such as an SD card) or from a communication network. When the concentrator Co is powered up, the processor 301 is capable of reading instructions from the RAM 302 and executing them. These instructions form a computer program causing the implementation, by the processor 301, of all or part of the method described in relation to FIG. 6.

The method described below in relation to FIG. 6 can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit). In general the meter comprises electronic circuitry configured for implementing the methods described in relation to FIG. 6.

Figure 4:
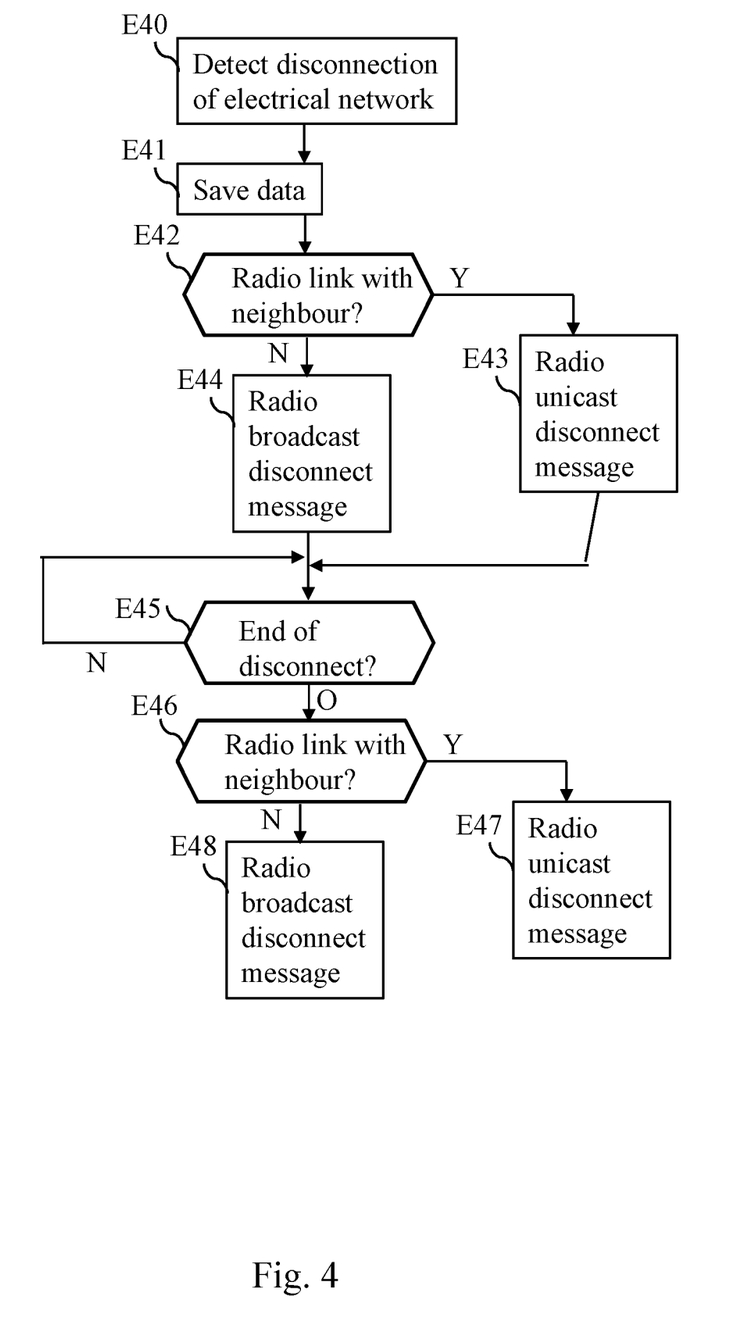
FIG. 4 illustrates an example of an algorithm executed by a node device when it detects a disconnection of the electrical energy supply according to the present invention.

FIG. 4 illustrates an example of an algorithm executed by a node device when it detects a disconnection of the electrical energy supply according to the present invention.

At the step E40, a node device, for example the node device CP5, detects a disconnection of the electrical energy supply. The disconnection of the electrical energy supply is for example detected when the voltage of the electrical energy is less than 70% of the nominal voltage of the electrical energy.

At the step E41, the node device CP5 proceeds with the saving of the data stored in the random access memory in the non-volatile memory.

At the step E42, the node device CP5 checks in its routing table whether it is connected to at least one neighbouring node device by a radio link.

If so, the node device CP5 passes to the step E43. If not, the node device CP5 passes to the step E44.

At the step E43, the node device CP5, according to the example in FIG. 1b, is connected to the neighbouring node device CP4 by a radio link. The node device CP5 demands the sending by the radio interface of a unicast message to the node device CP4 indicating a disconnection of the electrical energy supply and passes to the step E45.

At the step E44, the routing table of the node device CP5, according to the example in FIG. 1a, does not indicate that the node device CP5 is connected to one of its neighbouring node devices CP2, CP3 and CP4 by a radio link. The node device CP5 demands the sending by the radio interface of a broadcast message indicating a disconnection of the electrical energy supply.

More precisely, the message indicating a disconnection of the electrical energy supply comprises a field indicating a predetermined number of times that the message must be rebroadcast by a meter receiving the message. For example, the predetermined number is at a maximum equal to three, preferentially equal to zero. Once this operation has been performed, the node device CP5 passes to the step E45.

At the step E45, the node device CP5 checks whether an end of a disconnection of the electrical energy supply is detected. The end of disconnection of the electrical supply is for example detected when the voltage of the electrical energy is greater than 90% of the nominal voltage of the electrical energy.

If so, the node device CP5 passes to the step E46. If not, the node device CP5 returns to the step E45.

At the step E46, the node device CP5 checks in its routing table whether it is connected to at least one neighbouring node device.

If so, the node device CP5 passes to the step E47. If not, the node device CP5 passes to the step E48.

At the step E47, the node device CP5, according to the example in FIG. 1b, is connected to the neighbouring node device CP4 by a radio link. The node device CP5 demands the sending by the radio interface of a unicast message to the node device CP4 indicating the end of the disconnection of the electrical energy supply and interrupts the present algorithm.

At the step E48, the node device CP5, according to the example in FIG. 1a, is not connected to its neighbouring node devices CP2, CP3 and CP4 by a radio link. The node device CP5 demands the sending by the radio interface of a broadcast message indicating the end of the disconnection of the electrical energy supply.

More precisely, the broadcast message indicating a disconnection of the electrical energy supply comprises a field indicating a predetermined number of times that the message must be rebroadcast by a meter receiving the message. For example, the predetermined number is at a maximum equal to three, preferentially equal to zero.

Figure 5:
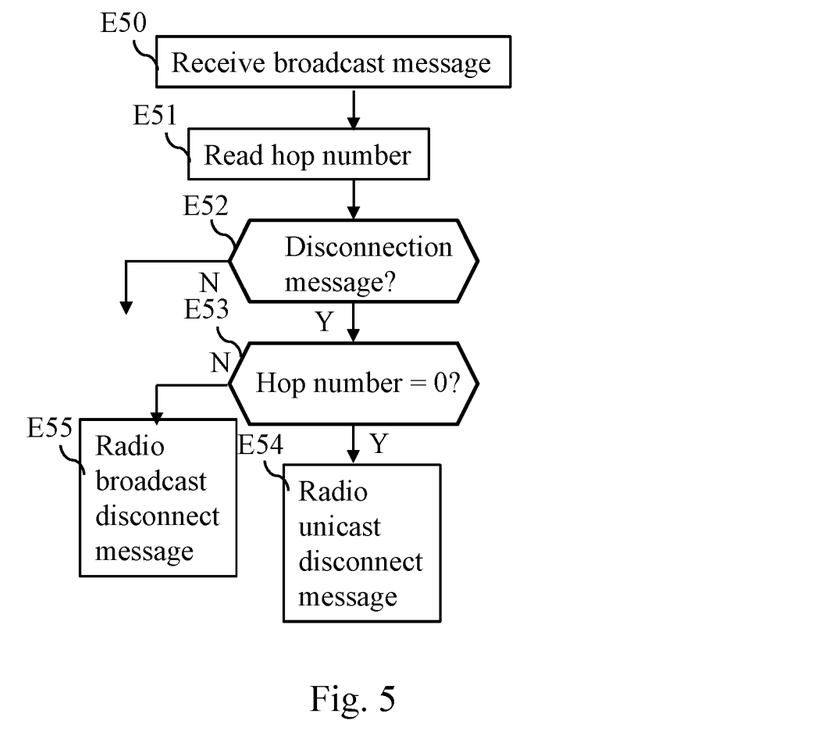
FIG. 5 illustrates an example of an algorithm executed by a meter when it receives a broadcast message according to the present invention.

FIG. 5 illustrates an example of an algorithm executed by a meter when it receives a broadcast message according to the present invention.

At the step E50, for example the node device CP2 in the example in FIG. 1a, receives a broadcast message.

At the step E51, the node device CP2 reads the value of the field indicating a predefined number of times that the message must be rebroadcast.

At the step E52, the node device CP2 checks whether the broadcast message received is a message indicating a disconnection of the electrical energy supply detected by the node device CP5.

If not, the node device CP2 processes the message broadcast in a conventional manner.

If so, the node device CP2 passes to the step E53.

At the step E53, the node device CP2 decrements the value of the field indicating a predetermined number of times that the message must be rebroadcast and checks whether this is at the zero value.

If so, the node device CP2 passes to the step E54. If not, the node device CP2 passes to the step E55.

At the step E54, the node device CP2 consults a routing table that comprises at least one path for communicating with the concentrator Co, selects a radio or powerline path and sends, to the concentrator Co, a unicast message indicating that the node device CP5 has detected a disconnection of the electrical energy supply.

At the step E55, the meter CP4 broadcasts the message received at the step E50.

Figure 6:
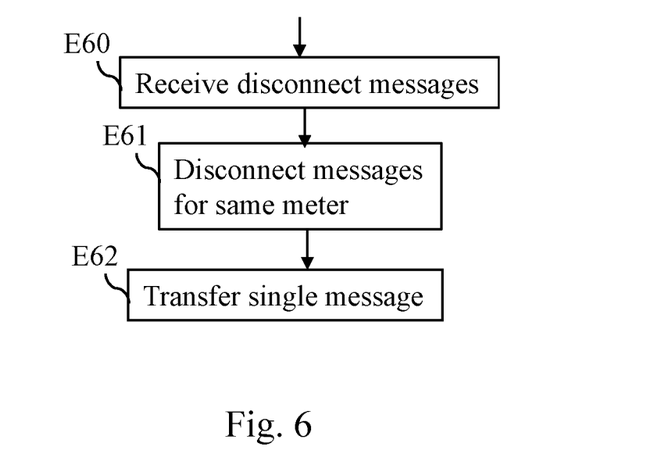
FIG. 6 illustrates an example of an algorithm executed by a concentrator when it receives messages notifying a disconnection of the electrical energy supply.

FIG. 6 illustrates an example of an algorithm executed by a concentrator when it receives messages notifying a disconnection of the electrical energy supply.

At the step E60, the concentrator Co detects the reception of one or more unicast and/or broadcast messages indicating a disconnection of the electrical energy supply of a meter.

At the step E61, the concentrator Co checks whether the messages received indicate a disconnection of the electrical energy supply for one and the same meter.

If so, the concentrator Co selects, at the step E62, only one message and transfers the selected message to the headend system HES. If only one message indicating a disconnection of the electrical energy supply for one and the same meter is received, the concentrator Co transfers the message received to the headend system HES.

The invention claimed is:

1. A method for transmitting a message from a first node device to one or more node devices that are neighbours of the first node device, the one or more node devices belonging to an electrical supply network using powerline and radio communications, wherein the method causes:
   detecting, by the first node device, a disconnection of an electrical energy supply to the first node device,
   determining, by the first node device, in a routing table, whether a radio link connects the first node device to a neighbouring node device after the disconnection of the electrical energy supply to the first node device,
   sending, by the first node device, in response to the first node device being determined to be connected by a radio link to a neighbouring node device and after the disconnection of the electrical energy supply to the first node device, a unicast message by the radio link to the neighbouring node device that indicates the disconnection of the electrical energy supply to the first node device,
   sending, by the first node device, in response to the first node device being determined to not be connected by a radio link to a neighbouring node device and after the disconnection of the electrical energy supply to the first node device, a radio broadcast message indicating that the disconnection of the electrical energy supply is detected by the first node device.

2. The method according to claim 1, wherein the radio broadcast message comprises a field indicating a predetermined number of times that the message must be rebroadcast by a node device receiving the broadcast message.

3. The method according to claim 2, wherein the predetermined number of times that the message must be rebroadcast is equal to zero.

4. The method according to claim 1, wherein the method causes:
   transferring, by a neighbouring node device receiving the radio broadcast message, to a concentrator node device, a unicast message indicating that the disconnection of the electrical energy supply is detected by the first node device.

5. The method according to claim 4, wherein the method causes:

checking by the concentrator node device whether a plurality of messages indicating the disconnection of the electrical energy supply detected by the first node device are received, transferring a single message to a headend system indicating that the disconnection of the electrical energy supply is detected by the first node device.

6. A non-transitory storage medium that stores a computer program comprising instructions for implementing, by a node, the method according to claim 1, when the program is executed by a processor of the node.

7. A device for transmitting a message from a first node device to one or more node devices that are neighbours of the first node device, the one or more node devices belonging to an electrical supply network using powerline and radio communications, wherein the first node device comprises circuitry causing the first node device to perform:

detecting a disconnection of an electrical energy supply to the first node device, determining, by the first node device, whether a radio link connects the first node device to a neighbouring node device after the disconnection of the electrical energy supply to the first node device, sending, in response to the first node device being determined to be connected by a radio link to a neighbouring node device and after the disconnection of the electrical energy supply to the first node device, a unicast message by the radio link to the neighbouring node device that indicates the disconnection of the electrical energy to the first node device, sending, in response to the first node device being determined to not be connected by a radio link to a neighbouring node device and after the disconnection of the electrical energy supply to the first node device, a radio broadcast message indicating that the disconnection of the electrical energy supply is detected by the first node device.

8. The device according to claim 7, wherein the first node device comprises circuitry causing the first node device to perform electrically supplying a node during at least the period of sending of the unicast or broadcast message by the radio link to the neighbouring node device.

* * * * *